Nov. 1, 1949.   H. P. JUNKIN   2,486,654

VALVE SEAT STRUCTURE

Filed Sept. 13, 1945

INVENTOR.
HERBERT P. JUNKIN
BY *Alden W. Redfield*
ATTORNEY.

Patented Nov. 1, 1949

2,486,654

UNITED STATES PATENT OFFICE 2,486,654

VALVE SEAT STRUCTURE

Herbert P. Junkin, Cincinnati, Ohio, assignor, by mesne assignments, to Crosley Motors, Inc., Cincinnati, Ohio, a corporation of Ohio Application September 13, 1945, Serial No. 616,004

3 Claims. (Cl. 123—188)

This invention relates to metallic structures and method of fabricating same, and is particularly concerned with the fabrication of internal combustion engines and engine parts from steel stampings and the like.

In fabricating such engines, it has been proposed to braze or weld pre-stamped parts into a unitary structure. For light weight engines, many of such stampings may be made of sheet steel of a thickness of $\frac{1}{16}$" or less, although other parts of such a fabricated structure, such as the cylinders, may be made from tubing $\frac{3}{32}$" in thickness. The specific thickness required depends of course upon the horsepower of the engine desired to be produced. For the purpose of the present application, I will describe my invention in connection with an engine of relatively small size, weight and horsepower, in which the specific metal thicknesses mentioned are satisfactory.

In fabricating such stamped parts, it is often necessary from the point of view of facilitating construction to form ridges or grooves which, when the parts are secured together by welding or otherwise, leave small cracks between the assembled parts that are very difficult to fill.

Such cracks are not permissible, particularly when they occur in or around the combustion chamber, for they not only bring about a loss of compression but also allow the cooling liquid such as water to leak into the cylinder from the water jackets, which surround the cylinders adjacent the combustion chamber.

It is an object of the present invention to make it possible to fabricate and assemble such parts into a strong unitary structure and at the same time to fill any small cracks or crevices between such parts, either in the form of complete assemblies or sub-assemblies.

I accomplish this by making certain parts of such configuration that they may be deformed to fit tightly against areas wherein cracks are likely to be present. After these parts have been assembled in place, they are bent outwardly or clinched against adjacent parts by the use of suitable tooling. I also make provision for the utilization of a brazing alloy so positioned and treated that it will flow between the parts, fill the spaces therebetween, and afford an excellent conducting bond for the purpose of dissipating heat.

Figure 1:
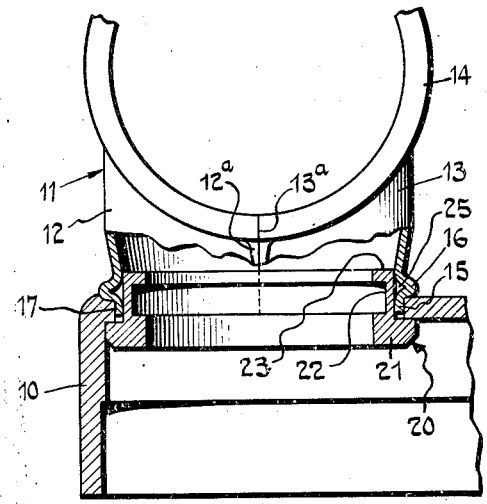
Figure 4:
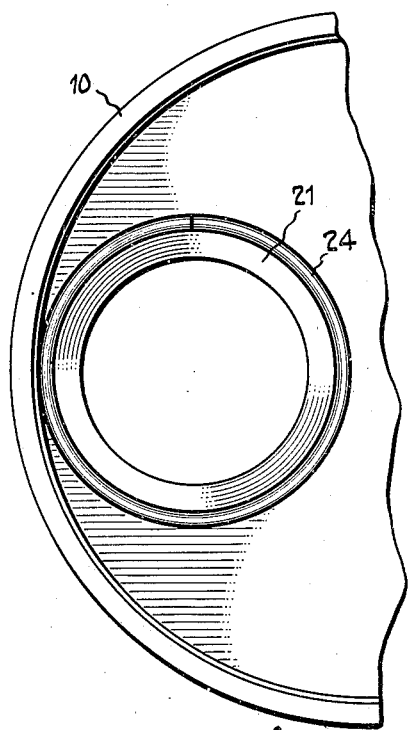
Figure 2:
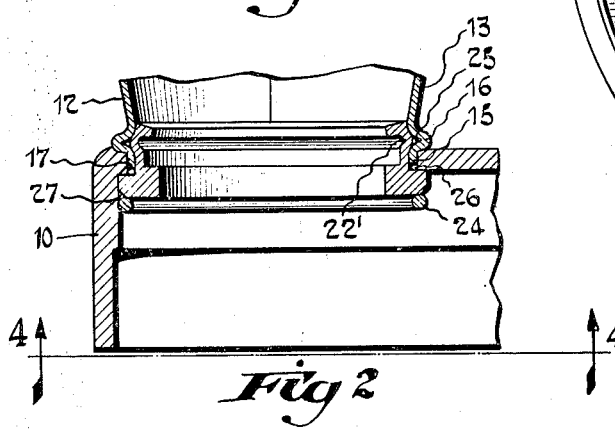
Figure 3:
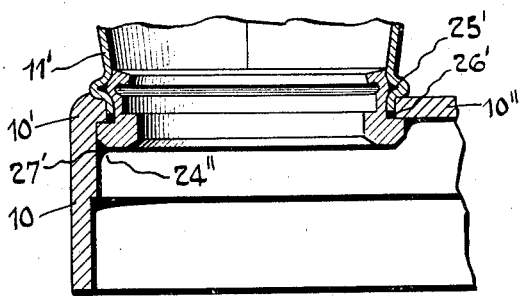

The novel features that I consider characteristic of my invention are set forth in the appended claims. The invention itself, however, both as to its organization and its method of operation, together with additional objects and advantages thereof, will best be understood from the following description of a specific embodiment when read in conjunction with the drawing, in which Fig. 1 is a side elevation with parts broken away to show a section of a cylinder head with which a fabricated exhaust port is to be united; in Fig. 2 is a similar section showing a valve insert with a part deformed and clinched against the interior of the exhaust port to fill a groove in said exhaust port structure; Fig. 3 is a similar view showing how the various parts are brazed together into a unitary structure; Fig. 4 is a bottom view looking up through the top of the cylinder, taken along line 4—4 of Fig. 2.

The exhaust port assembly 11 is made of two halves 12 and 13 that may be secured together to form a curved conduit or port for exhausting the gases from the engine. Each of the two parts has a straight edge portion 12a and 13a adapted to abut against the other in a single plane so that the weld or joint between them may be accomplished in that plane. The port may be provided with an outer inturned flange 14 at the top adapted to be connected to an exhaust manifold and an inner rim 15 at the bottom having an exterior peripheral bead 16 adjacent thereto. The rim 15 is formed accurately so that it can fit within the opening 17 preferably circular in form, in the upper wall of the cylinder head 10. The bead 16 forms a shoulder to limit the extent to which the rim 15 may be inserted. Interiorly of the bead 16 is a groove 25 which extends around the inner periphery of the combined members 12 and 13.

The cylinder head and the exhaust port assembly may be constructed of any suitable steel plate that can be deformed in suitable dies to produce the shapes desired, and still retain its strength and ability to withstand the heat in the exhaust gases.

A valve seat insert 20, preferably made of vanadium steel to provide a suitable hard valve seat surface, may be provided for insertion from the inside of the cylinder up through the interior of the exhaust port as shown in Fig. 1. The valve seat insert is provided with an annular base 21 that is beveled as shown, and an upper flange 23 connected by a deformable wall 22. The wall 22 is elongated or machined so that it is somewhat thinner than the adjoining parts and thus readily deformable. As shown in Fig. 2, this deformable wall is pushed radially outwardly and clinched into the groove 25 as by a suitable tool inserted through the bottom opening in the valve seat insert 20. The deformed wall is indicated at 22'.

A ring 24 of brazing material such as copper is temporarily secured to the outer edge of the insert 20 as indicated in Fig. 2, as by a suitable copper paste.

The entire assembly is now run through a brazing oven in a non-oxidizing gas, at a temperature of approximately 2000° F. for a period of about twenty minutes or sufficient to cause the brazing material 24 to melt and run into the capillary spaces between the port and into the spaces 25, 26 and 27, as at 25', 26' and 27', forming a strong unitary bond. These crevices and particularly the crevices formed between the parts 12 and 13 at bead 16 are filled with brazing material and the assembly rendered completely fluid and gas tight.

It will be understood that the intake port assembly on the cylinder shown is fabricated in the same way as are the corresponding structures in the other cylinders and the various parts secured together in a strong, unitary, gas tight relationship. Of course, these assemblies are put through the brazing furnace at the same time so that all the parts may be brazed simultaneously.

I claim:

1. In combination with an internal combustion engine having a plurality of pre-stamped parts including a cylinder head, a cylindrical port element connected therewith, a valve seat insert having a deformed side wall clinched against said port element, and brazing material between the respective parts for securing the same together into a unitary body.

2. In combination with an internal combustion engine having a plurality of pre-stamped parts including a cylinder head, a port connected therewith, a valve seat insert clinched against said port and secured thereto and to said cylinder by a brazing material.

3. In combination with an intake and exhaust port for internal combustion engines, said ports having an end for insertion into a cylinder, and an outwardly extending bead for limiting the degree of insertion, said bead forming a groove interiorly of said port, a valve seat insert for insertion into the opening formed by said end, said insert having a deformable wall for clinching against the interior of said port and into said groove.

HERBERT P. JUNKIN.

REFERENCES CITED

The following references are of record in the file of this patent:

UNITED STATES PATENTS

| Number | Name | Date |
|---|---|---|
| 35,691 | Knickerbocker | June 24, 1862 |
| 586,438 | Inshaw | July 13, 1897 |
| 915,792 | Palmer | Mar. 23, 1909 |
| 1,569,245 | Willgoos | Jan. 12, 1926 |
| 1,838,160 | Smith | Dec. 29, 1931 |
| 1,903,485 | Smith | Apr. 11, 1933 |
| 1,974,949 | Campbell | Sept. 25, 1934 |
| 2,007,543 | Meeker | July 9, 1935 |
| 2,197,039 | Gottlieb | Apr. 16, 1940 |
| 2,300,517 | Milton | Nov. 3, 1942 |

FOREIGN PATENTS

| Number | Country | Date |
|---|---|---|
| 390,744 | Great Britain | Apr. 13, 1933 |

OTHER REFERENCES

General Electric Review, August 1936, pp. 381-387.